US011398044B2

(12) United States Patent
Ye

(10) Patent No.: US 11,398,044 B2
(45) Date of Patent: Jul. 26, 2022

(54) METHOD FOR FACE MODELING AND RELATED PRODUCTS

(71) Applicant: GUANGDONG OPPO MOBILE TELECOMMUNICATIONS CORP., LTD., Guangdong (CN)

(72) Inventor: Qing Ye, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 44 days.

(21) Appl. No.: 16/931,830

(22) Filed: Jul. 17, 2020

(65) Prior Publication Data

US 2020/0349731 A1 Nov. 5, 2020

Related U.S. Application Data

(63) Continuation of application No. PCT/CN2019/081547, filed on Apr. 4, 2019.

(30) Foreign Application Priority Data

Apr. 12, 2018 (CN) .......................... 201810327932.5

(51) Int. Cl.
*G06V 40/16* (2022.01)
*G06T 7/579* (2017.01)
(Continued)

(52) U.S. Cl.
CPC .............. *G06T 7/579* (2017.01); *G06N 3/08* (2013.01); *G06T 7/194* (2017.01); *G06T 7/75* (2017.01);
(Continued)

(58) Field of Classification Search
CPC ........... G06T 7/579; G06T 7/194; G06T 7/75; G06T 17/10; G06T 2207/10028;
(Continued)

(56) References Cited

U.S. PATENT DOCUMENTS

2010/0201949 A1\* 8/2010 Barnett .................. G03B 25/00
352/101
2015/0092982 A1\* 4/2015 Kang .................. G06K 9/3241
382/103
(Continued)

FOREIGN PATENT DOCUMENTS

CN 101339669 1/2009
CN 101814192 8/2010
(Continued)

OTHER PUBLICATIONS

SIPO, First Office Action for CN Application No. 201810327932.5, dated Jul. 30, 2020.
(Continued)

*Primary Examiner* — Phuoc Tran
(74) *Attorney, Agent, or Firm* — Hodgson Russ LLP

(57) ABSTRACT

A method for face modeling and related products are provided. The method includes the following. Multiple first images of a face of an object at multiple different angles are obtained when the face rotates, where each first image is obtained at a different angle. Face detection is performed on any first image of the multiple first images, and the any first image is divided into a first face region and a first background region. Multiple depth images corresponding to the multiple first images are obtained and each of the multiple depth images is segmented according to the first face region and the first background region to obtain multiple face region images. Three-dimensional (3D) face modeling is performed according to the multiple face region images to obtain a 3D face image.

17 Claims, 7 Drawing Sheets

(51) Int. Cl.
*G06T 7/194* (2017.01)
*G06T 7/73* (2017.01)
*G06N 3/08* (2006.01)
*G06T 17/10* (2006.01)

(52) U.S. Cl.
CPC ............ *G06T 17/10* (2013.01); *G06V 40/165* (2022.01); *G06V 40/171* (2022.01); *G06T 2207/10028* (2013.01); *G06T 2207/30201* (2013.01)

(58) Field of Classification Search
CPC ...... G06T 2207/30201; G06K 9/00248; G06K 9/00281; G06N 3/08
See application file for complete search history.

(56) References Cited

U.S. PATENT DOCUMENTS

| | | |
|---|---|---|
| 2016/0225137 A1 | 8/2016 | Horovilz et al. |
| 2016/0335481 A1 | 11/2016 | Hsieh et al. |
| 2017/0154461 A1 | 6/2017 | Rhee et al. |
| 2017/0316582 A1* | 11/2017 | Chen .................... H04N 5/247 |

FOREIGN PATENT DOCUMENTS

| | | |
|---|---|---|
| CN | 103247074 | 8/2013 |
| CN | 103971408 | 8/2014 |
| CN | 104574432 | 4/2015 |
| CN | 104599284 | 5/2015 |
| CN | 107633165 | 1/2018 |
| JP | 2000076454 | 3/2000 |

OTHER PUBLICATIONS

Kim et al, "Accurate 3D face modeling and recognition from RGB-D stream in the presence of large pose changes", IEEE International Conference on Image Processing (ICIP), 2016, pp. 3011-3015.
Jiang et al, "Deep Face Feature for Face Alignment and Reconstruction", arXiv:1708.02721v1 [cs.CV], Aug. 2017, 8 pages.
EPO, Extended European Search Report for EP Application No. 19785471.4, dated May 3, 2021.
CNIPA, Notification to Grant Patent Right for Invention for CN Application No. 201810327932.5, dated May 8, 2021.
WIPO, ISR for PCT/CN2019/081547, dated Jun. 18, 2019.
IPI, First Examination Report for Indian Application No. 202027035882, dated Nov. 18, 2021.

* cited by examiner

METHOD FOR FACE MODELING AND RELATED PRODUCTS

CROSS-REFERENCE TO RELATED APPLICATION(S)

This application is a continuation of International Application No. PCT/CN2019/081547, filed Apr. 4, 2019, which claims priority to Chinese Patent Application 201810327932.5, filed Apr. 12, 2018, the entire disclosures of which are hereby incorporated by reference.

TECHNICAL FIELD

This disclosure relates to the technical filed of image processing, and in particular to a method for face modeling and related products.

BACKGROUND

With the rapid development of image processing technology, demands of users on image effects are increasing, and more and more three-dimensional (3D) image applications are installed in electronic devices (such as mobile phones and tablet computers). For example, after the user takes an image of a face (i.e., a face image) through the electronic device, the electronic device can recognize the face image and convert the face image to be in an animation style, making the face image more entertaining. Meanwhile, the 3D face modeling technology has gained more and more attention, which can be applied to the fields of VR games, virtual try-on and wear-on, medical plastic surgery and so on.

The current 3D face modeling technology involves face modeling with depth images. In detail, by analyzing depth images at different angles, face modeling is achieved. However, the depth image has defects of high noise and low resolution, which affects accuracy of 3D face modeling. Therefore, there is a need to solve the problem with improving the accuracy of 3D face modeling.

SUMMARY

According to a first aspect, a method for face modeling is provided. The method includes the following.

Multiple first images of a face of an object at multiple different angles are obtained when the face rotates, where each first image is obtained at a different angle. Face detection is performed on any first image of the multiple first images, and the any first image is divided into a first face region and a first background region. Multiple depth images corresponding to the multiple first images are obtained and each of the multiple depth images is segmented according to the first face region and the first background region to obtain multiple face region images. 3D face modeling is performed according to the multiple face region images to obtain a 3D face image.

According to a second aspect, an electronic device is provided. The electronic device includes at least one processor, a non-transitory computer readable storage, and at least one camera coupled with the at least one processor.

The at least one camera is configured to obtain multiple first images of a face of an object at multiple different angles when the face rotates, where each first image is obtained at a different angle. The computer readable storage is coupled to the at least one processor and stores at least one computer executable instruction thereon which, when executed by the at least one processor, causes the at least one processor to: perform face detection on any first image of the multiple first images, and divide the any first image into a first face region and a first background region; obtain multiple depth images corresponding to the multiple first images, and segment each of the multiple depth images according to the first face region and the first background region to obtain multiple face region images; perform 3D face modeling according to the multiple face region images to obtain a 3D face image.

According to a third aspect, a non-transitory computer readable storage medium is provided. The non-transitory computer readable storage medium is configured to store a computer program which, when executed by a processor, causes the processor to execute the method of the first aspect.

BRIEF DESCRIPTION OF THE DRAWINGS

To illustrate technical solutions embodied by the implementations of the present disclosure or by the related art more clearly, the following briefly introduces the accompanying drawings required for describing the implementations or the related art. Apparently, the accompanying drawings in the following description merely illustrate some implementations of the present disclosure. Those of ordinary skill in the art may also obtain other drawings based on these accompanying drawings without creative efforts.

To illustrate technical solutions embodied by the implementations of the present disclosure or by the related art more clearly, the following briefly introduces the accompanying drawings required for describing the implementations or the related art. Apparently, the accompanying drawings in the following description merely illustrate some implementations of the present disclosure. Those of ordinary skill in the art may also obtain other drawings based on these accompanying drawings without creative efforts.

DETAILED DESCRIPTION

Hereinafter, technical solutions of implementations of the disclosure will be described in a clear and comprehensive manner in reference to the accompanying drawings intended for the implementations. It is evident that the implementations described herein constitute merely some rather than all of the implementations of the disclosure, and that those of ordinary skill in the art will be able to derive other implementations based on these implementations without making inventive efforts, which all such derived implementations shall all fall in the protection scope of the disclosure.

The terms "first", "second" used in the specification, the claims, and the accompany drawings of the present disclosure are used to distinguish different objects rather than describe a particular order. In addition, the terms "include", "comprise", and "have" as well as variations thereof are intended to cover non-exclusive inclusion. For example, a process, method, system, product, or apparatus including a series of operations or units is not limited to the listed operations or units, it can optionally include other operations or units that are not listed; alternatively, other operations or units inherent to the process, method, product, or device can be included either.

The term "implementation" referred to herein means that a particular feature, structure, or feature described in connection with the implementation may be contained in at least one implementation of the present disclosure. The phrase appearing in various places in the specification does not necessarily refer to the same implementation, nor does it refer an independent or alternative implementation that is mutually exclusive with other implementations. It is expressly and implicitly understood by those skilled in the art that an implementation described herein may be combined with other implementations.

"Electronic device" in the implementations of the disclosure may include various handheld devices with wireless communication functions, on-board devices, wearable devices, computing devices, or other processing devices connected to a wireless modem, as well as various forms of user equipment (UE), mobile stations (mobile station, MS), terminal device, etc. For convenience of description, the above-mentioned devices are collectively referred to as electronic devices.

The following describes implementations of the disclosure in detail.

Figure 1A:
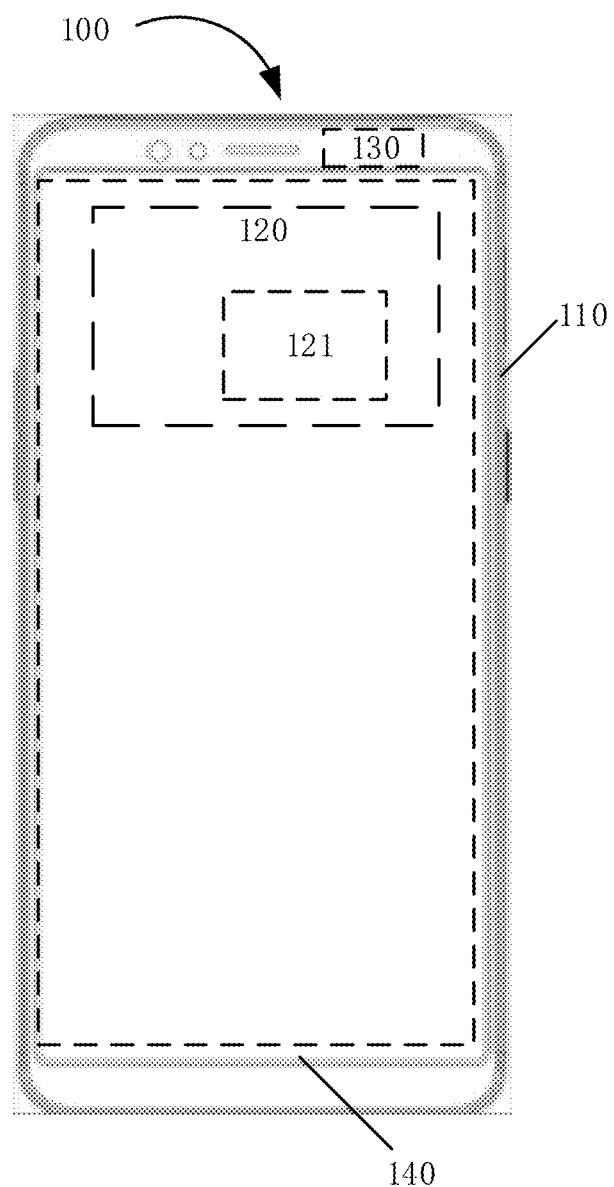
FIG. 1A is a schematic structural diagram illustrating an electronic device according to implementations.

FIG. 1A is a schematic structural diagram illustrating an electronic device 100 according to implementations. The electronic device 100 includes a housing 110, a circuit board 120 disposed in the housing 110, at least one camera 130, a non-transitory computer readable storage, and a display screen 140 disposed on the housing 110. The circuit board 120 is provided with at least one processor (such as, a processor 121). The camera 130 is coupled with the processor 121. The processor 121 is coupled with the display screen 140. The non-transitory computer readable storage is coupled to the processor 121 and stores at least one computer executable instruction thereon.

The at least one camera is configured to obtain multiple first images of a face of an object at multiple different angles when the face rotates, where each first image is obtained at a different angle, that is, each first image corresponds to a unique angle.

The processor is configured to: perform face detection on any first image of the multiple first images, and divide the any first image into a first face region and a first background region; obtain multiple depth images corresponding to the multiple first images, and segment each of the multiple depth images according to the first face region and the first background region to obtain multiple face region images; perform three-dimensional (3D) face modeling according to the multiple face region images to obtain a 3D face image.

According to the implementations, there can be at least one camera 130. When there are two or more cameras, the two or more cameras can include a front camera and a rear camera. The above camera 130 can also be a depth camera. The depth camera can collect depth information of an image(s) or frame(s) during capturing, including information on depth of the object. The at least one camera 130 can be configured to, during rotation of the face, obtain the multiple first images of the face at multiple angles and obtain the multiple depth images corresponding to the multiple first images. The display screen 140 can be configured to display the images obtained by the at least one camera. The processor 121 is configured to control the at least one camera to perform capturing and to perform 3D face modeling according to the multiple depth images obtained.

In at least one implementation, in terms of obtaining the multiple first images of the face at the multiple different angles when the face rotates, the at least one camera 130 is configured to: detect an angular velocity of rotation of the face when the face rotates; determine whether the angular velocity is less than a preset threshold; obtain the multiple first images of the face at the multiple different angles based on a determination that the angular velocity is less than the preset threshold.

In at least one implementation, in terms of performing face detection on the any first image of the multiple first images and dividing the any first image into the first face region and the first background region, the processor 121 is configured to: obtain a second image by preprocessing the any first image; obtain multiple feature points by performing feature point extraction on the second image; construct an external contour of the face according to the multiple feature points, and take inside of the external contour as the first face region and take outside of the external contour as the first background region.

In at least one implementation, in terms of segmenting each of the multiple depth images according to the first face region and the first background region to obtain the multiple face region images, the processor 121 is configured to: for each of the multiple depth images, divide the each depth image into a second face region and a second background region according to depth information of the each depth image, to obtain multiple second face regions and multiple second background regions; compare each of the multiple second face regions with the first face region to obtain multiple first sub-regions, where each first sub-region is a region in the second face region that matches the first face region; compare each of the multiple second background regions with the first background region to obtain multiple second sub-regions, where each second sub-region is a region in the second background region that fails to match the first background region; synthesize the multiple first sub-regions and the multiple second sub-regions into the multiple face region images.

In at least one implementation, in terms of performing 3D face modeling according to the multiple face region images to obtain the 3D face image, the processor 121 is configured to: for each of the multiple face region images, determine a set of points of interest corresponding thereto, to obtain multiple sets of points of interest, where each of the multiple sets of points of interest includes at least one point of interest and corresponds to an angle value; input depth information of all points of interest in the multiple sets of points of interest into a preset 3D convolutional neural network (CNN) to obtain multiple geometric descriptors, where the preset 3D CNN is configured to operate on the depth information of all points of interest to obtain the multiple geometric descriptors; divide the multiple sets of points of interest into multiple groups, where each group includes two sets of points of interest and an angle value corresponding one of the two sets of points of interest is adjacent to an angle value corresponding to the other one of the two sets of points of interest; for each group, compare the two sets of points of interest to obtain a target set of points of interest, where the target set of points of interest contains at least one pair of target points of interest, the pair of target points of interest includes two points of interest which are matched during comparison, and one group corresponds to one target set of points of interest; for each group, connect, according to at least one pair of points of interest in the target set of points of interest, two face region images corresponding to the each group in the multiple face region images, to obtain the 3D face image.

Figure 1B:
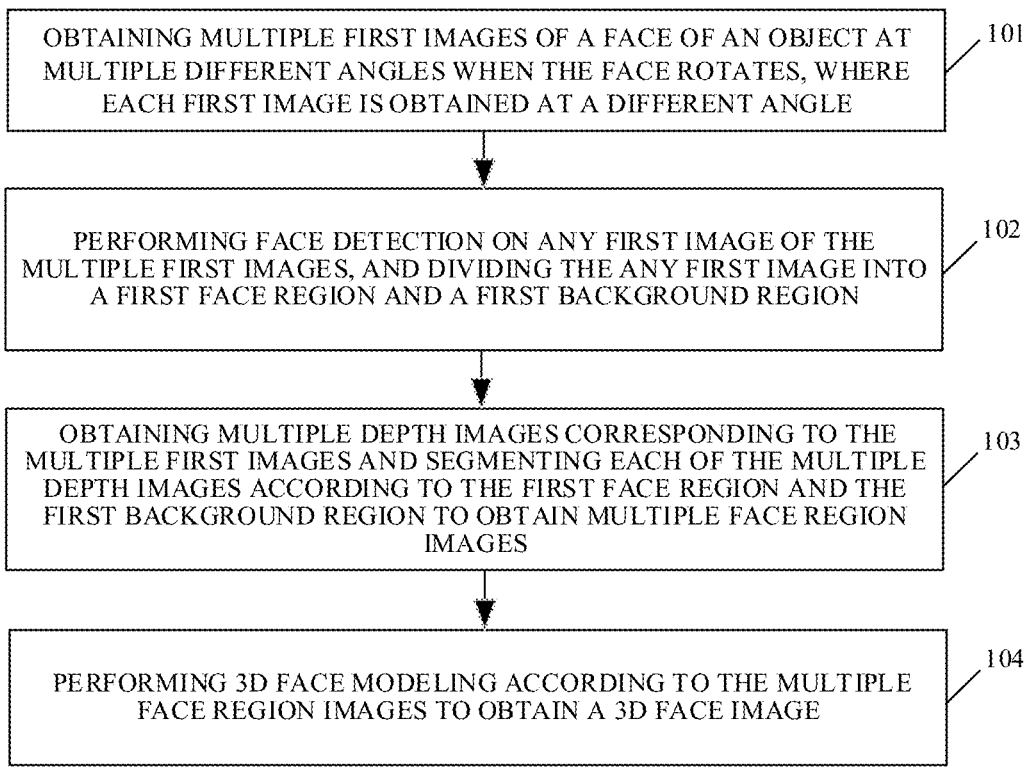
FIG. 1B is a schematic flowchart illustrating a method for face modeling according to implementations.

FIG. 1B is a schematic flowchart illustrating a method for face modeling according to implementations. The method is applied to the electronic device of FIG. 1A. The method begins at 101.

At 101, multiple first images of a face of an object at multiple different angles are obtained when the face rotates, where each first image is obtained at a different angle.

According to the implementations, the object can be a human (such as a user) or an animal, and the user can aim his/her face at a camera of the electronic device and rotate his/her head by a certain angle. During rotation of the face of the user, the electronic device controls the camera to capture or shoot the multiple first images, where each first image is captured at a unique angle. Since each first image is captured at a different angle, the multiple first images of the face at various angles (which include a front face and a side face) can be captured, such that the multiple first images can cover various regions of the face. In an example, if more than two images at the same angle are captured, only one first image at that angle can be kept. For example, in order to ensure that the multiple first images captured can completely cover various regions of the face, the user may be required to rotate his/her head at an angle greater than 90 degrees (for example, the head of the user can be rotated 150 degrees from left to right (or from right to left)), and then the multiple first images at multiple angles are captured through the camera.

At 102, face detection is performed on any first image of the multiple first images, and the any first image is divided into a first face region and a first background region.

According to the implementations, each first image can contain face and background. Therefore, the any first image of the multiple first images can be divided into the first face region and the first background region. The division result can assist the electronic device to perform image segmentation on multiple depth images corresponding to the multiple first images. In an example, a front face image (an image containing a front face) of the face can be selected as the any first image. Since the front face image can reflect the largest range of the face, the obtained first face region and first background region can better assist the segmentation of the multiple depth images.

In at least one implementation, with respect to operation 102, face detection is performed on the any first image of the multiple first images and the any first image is divided into the first face region and the first background region as follows.

At 21, a second image is obtained by preprocessing the any first image.

At 22, multiple feature points are obtained by performing feature point extraction on the second image.

At 23, an external contour of the face is constructed according to the multiple feature points, and inside of the external contour is taken as the first face region and outside of the external contour is taken as the first background region.

The above preprocessing includes the following operations: image enhancement, binarization, converting color image into grayscale image. Performing feature point extraction on the second image can be implemented with the following algorithms: Harris corner detection algorithm, scale invariant feature transform (SIFT), SUSAN corner detection algorithm, etc., which will not be repeated herein.

Figure 1C:
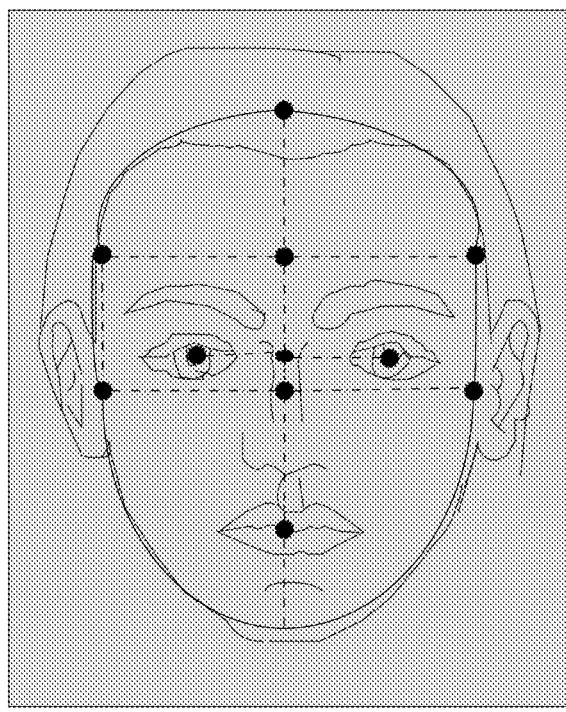
FIG. 1C is a schematic diagram illustrating division of a second image into a first face region and a first background region according to implementations.

According to the implementations, the multiple feature points refer to feature points of the face region and can include feature points of the left eye, right eye, nose, mouth, chin, and other regions. After the multiple feature points are obtained, a closed external contour (or peripheral contour) can be obtained according to the multiple feature points and the second image can be divided into the first face region and the first background region according to the external contour. For example, FIG. 1C is a schematic diagram illustrating division of the second image into the first face region and the first background region according to implementations.

At 103, multiple depth images corresponding to the multiple first images are obtained and each of the multiple depth images is segmented according to the first face region and the first background region to obtain multiple face region images.

The "depth image" refers to a 3D image which reflects the geometry of the visible surface in space.

According to the implementations, in the process of shooting the multiple first images, depth information corresponding to each first image can be collected, and a depth image is generated according to the depth information. As such, the multiple depth images corresponding to the multiple first images are obtained.

In an example, regarding obtaining the multiple depth images corresponding to the multiple first images, the multiple depth images can be obtained by converting each first image of the multiple first images into a depth image according to a 3D reconstruction algorithm. In detail, the above 3D reconstruction algorithm can include any of: Disney's new image algorithm, structure from motion (SFM) algorithm, and Kinect fusion algorithm. For example, in the case that the camera of the electronic device is a general camera, the SFM algorithm can be used to perform 3D reconstruction on each first image to obtain a corresponding depth image. For another example, in the case that the camera of the electronic device is a depth camera, the Kinect fusion algorithm can be used to perform 3D reconstruction on each first image to obtain a corresponding depth image.

In at least one implementation, with respect to operation 103, each of the multiple depth images is segmented according to the first face region and the first background region to obtain the multiple face region images as follows.

At 31, for each of the multiple depth images, the each depth image is divided into a second face region and a second background region according to depth information of the each depth image, to obtain multiple second face regions and multiple second background regions.

At 32, each of the multiple second face regions is compared with the first face region to obtain multiple first sub-regions, where each first sub-region is a region in the second face region that matches the first face region, and each of the multiple second background regions is compared with the first background region to obtain multiple second sub-regions, where each second sub-region is a region in the second background region that fails to match the first background region.

At 33, the multiple first sub-regions and the multiple second sub-regions are synthesized into the multiple face region images.

For any of the multiple depth images, depth information of the any depth image can be obtained. In an example, a 3D coordinate system can be established in advance and the depth information of the any depth image includes 3D coordinates of all pixels. According to the 3D coordinates of all pixels, the any depth image is divided into the second face region and the second background region. The other depth images except for the any depth image of the multiple depth images are divided in a similar manner. In this way, the multiple second face regions and the multiple second background regions are obtained.

If the depth image is divided into the second face region and the second background region simply or directly according to the depth information, the noise will be large, which results in low accuracy of the obtained second face region. According to the implementations, since the first image in operation 102 is a two-dimensional (2D) image and performing feature extraction on the 2D image has a high stability, in operation 102 (the first image is divided into the first face region and the first background region according to face detection), the obtained first face region has high accuracy. Compared with performing image segmentation on the multiple depth images simply or directly through the depth information, using the first face region and the first background region to assist image segmentation of the multiple depth images can reduce influence of noise caused by the depth information and improve accuracy of image segmentation.

Regarding comparing the multiple second face regions with the first face region respectively, any second face region of the multiple second face regions is compared with the first face region to obtain a first sub-region which is a region in the any second face region that matches the first face region. In terms of comparing the any second face region with the first face region, feature points of a region contour of the any second face region and feature points of a region contour of the first face region are selected and then compared. For any feature point to-be-compared of the feature points of the any second face region, if this feature point is matched with any of the feature points of the first face region, this feature point is determined to belong to the face region and not belong to the background region; if this feature point is not matched with any of the feature points of the first face region, this feature point is determined to belong to the background region and not belong to the face region. Thereafter, the first sub-region is constructed according to matched feature points in the any second face region. It can be understood that, for other second face regions except for the any second face region of the multiple second face regions, similar comparison can be performed to obtain the multiple first sub-regions.

Regarding comparing the multiple second background regions with the first background region respectively, any second background region of the multiple second background regions is compared with the first background region to obtain a second sub-region which is a region in the any second background region that fails to match the first background region. In terms of comparing the any second background region with the first background region, feature points of a region contour of the any second background region and feature points of a region contour of the first background region are selected and then compared. For any feature point to-be-compared of the feature points of the any second background region, if this feature point is matched with any of the feature points of the first background region, this feature point is determined to belong to the background region and not belong to the face region; if this feature point is not matched with any of the feature points of the first background region, this feature point is determined to belong to the face region (or foreground region) and not belong to the background region. Thereafter, the second sub-region is constructed according to mis-matched feature points in the any second background region. It can be understood that, for other second background regions except for the any second background region of the multiple second background regions, similar comparison can be performed to obtain the multiple second sub-regions.

In operation 33, each first sub-region of the multiple first sub-regions corresponds to a unique angle value and each second sub-region of the multiple second sub-regions corresponds to a unique angle value. According to the angle value corresponding to each first sub-region of the multiple first sub-regions and the angle value corresponding to each second sub-region of the multiple second sub-regions, one first sub-region and one second sub-region corresponding to the same angle value are synthesized into one face region image. In this way, the multiple first sub-regions and the multiple second sub-regions are synthesized according to a relationship between angle values and sub-regions, to obtain the multiple face region images.

At 104, 3D face modeling is performed according to the multiple face region images to obtain a 3D face image.

According to the implementations, each of the multiple face region images corresponds to an angle value and is a partial face region image at a corresponding angle. Therefore, according to points of interest in each face region image, the multiple face region images are connected in terms of various angle values from left to right (or from right to left), to obtain a complete 3D face image.

In at least one implementation, with respect to operation 104, 3D face modeling is performed according to the multiple face region images to obtain the 3D face image as follows.

At 41, for each of the multiple face region images, determine a set of points of interest corresponding thereto, to obtain multiple sets of points of interest, where each of the multiple sets of points of interest includes at least one point of interest and corresponds to an angle value.

At 42, depth information of all points of interest in the multiple sets of points of interest is input into a preset 3D CNN to obtain multiple geometric descriptors, where the preset 3D CNN is configured to operate on the depth information of all points of interest to obtain the multiple geometric descriptors.

At 43, the multiple sets of points of interest are divided into multiple groups, where each group includes two sets of points of interest and an angle value corresponding one of the two sets of points of interest is adjacent to an angle value corresponding to the other one of the two sets of points of interest, and for each group, compare the two sets of points of interest to obtain a target set of points of interest, where the target set of points of interest contains at least one pair of target points of interest, the pair of target points of interest includes two points of interest which are matched during comparison, and one group corresponds to one target set of points of interest.

At 44, for each group, connect, according to at least one pair of points of interest in the target set of points of interest, two face region images corresponding to the each group in the multiple face region images, to obtain the 3D face image.

According to the implementations, determine a set of points of interest corresponding to the each of the multiple face region images as follows. Perform interest point detection on each face region image according to speed-up robust features (SURF) or SIFT algorithm to obtain the set of points of interest containing at least one point of interest, where each set of points of interest corresponds to an angle value of one face region image.

Figure 1D:
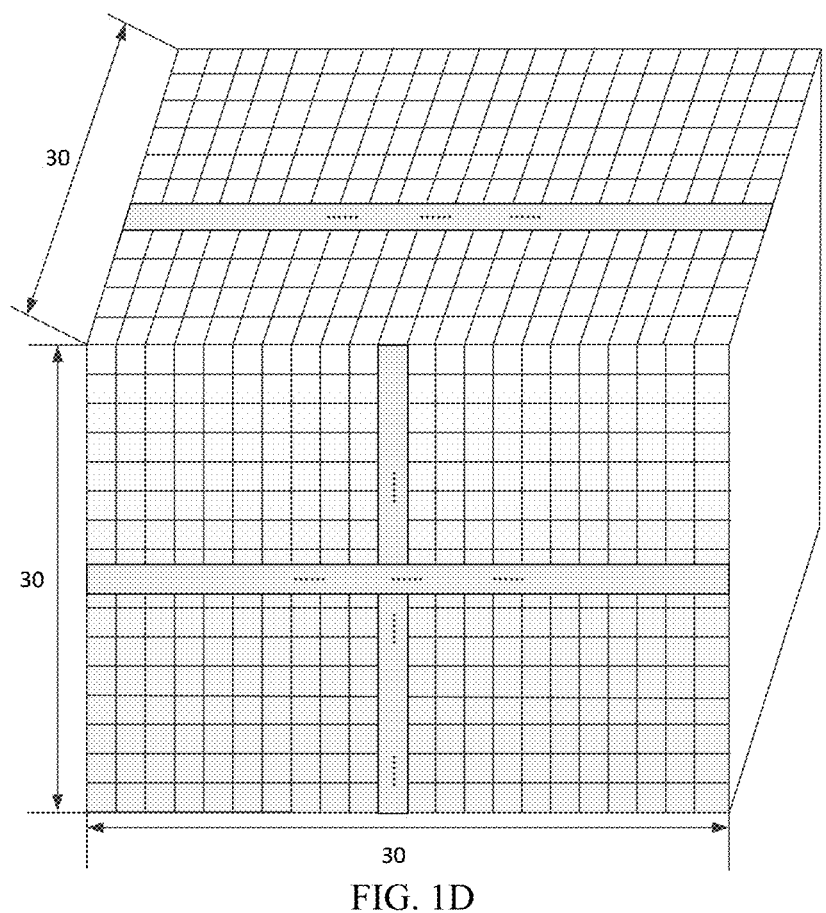
FIG. 1D is a schematic diagram illustrating a truncated distance function of a voxel grid according to implementations.

In operation 42, the depth information of all points of interest in the multiple sets of points of interest are determined. In an example, for each point of interest in each set of point of interests, 3D coordinates of the point of interest in a preset 3D coordinate system are acquired. The above preset 3D CNN is a pre-trained 3D CNN. In detail, for each point of interest, the 3D coordinates of the point of interest are first subjected to data conversion, and the 3D coordinates are expressed as a truncated distance function of a voxel grid of a preset size. For example, the 3D coordinates are expressed as a truncated distance function of a 30*30*30 voxel grid. FIG. 1D is a schematic diagram of a truncated distance function of a voxel grid according to implementations. For each point of interest, a truncated distance function of a 30*30*30 voxel grid corresponding to the point of interest is input into the 3D CNN for operation to output an operation result, where the operation result constitutes a geometric descriptor of the point of interest. Furthermore, the 3D CNN is trained as follows. Each set of sample data in multiple sets of sample data for training is input into an initial 3D CNN, assuming that the 3D CNN includes N layers and N is an integer greater than 2. According to each set of sample data and weight data of each layer, a forward operation at N layers is performed to obtain an output result. According to the output result, a gradient corresponding to the output result is obtained. According to the gradient corresponding to the output result, a backward operation at N layers is performed to obtain a weight gradient of each layer. According to the weight gradient of each layer, the weight data of each layer is updated. After multiple iterations, final weight data is obtained. The final weight data is then used as convolution kernels of the initial 3D CNN to obtain the trained 3D CNN. The multiple sets of sample data used to train the 3D CNN can come from data in images captured by the electronic device, an open source data set(s), or other data in images obtained during 3D face modeling, such that the multiple sets of sample data can be diversity, improving accuracy of calculating the 3D CNN.

With regard to connecting the multiple face region images in an order of various angle values, two sets of points of interest corresponding to two adjacent or closest angle values can be grouped together. For example, if twenty first images at twenty different angles are captured and twenty angle values correspond to twenty sets of points of interest, a first set of points of interest and a second set of points of interest are grouped into one group, the second set of points of interest and a third set of points of interest are grouped into one group, the third set of points of interest and a fourth set of points of interest are grouped into one group, and so on. At last, multiple groups are obtained. In this way, nineteen groups can be obtained by grouping the twenty sets of points of interest, with each group has two sets of points of interest.

The two sets of points of interest in each group are compared as follows. For the two sets of points of interest in each group, calculate an Euler distance between point of interest A in one of the two sets of points of interest and point of interest B in the other of the two sets of points of interest, where point of interest A is any point of interest in one set of points of interest, point of interest B is any point of interest in the other set of points of interest. If the Euler distance between point of interest A and point of interest B is less than a preset distance, point of interest A and point of interest B are the same point in the actual physical space, which means that point of interest A is matched with point of interest B. After point of interest A is matched with point of interest B, points of interest other than point of interest A in one set of points of interest are compared with the other set of points of interest, until points of interest in the two sets of points of interest in each group that can be matched are determined. The formula for calculating the Euler distance is as follows:

$$\mathrm{disf}(A(x_1,z_1),B(x_2,y_2,z_2)) = \sqrt{(x_1-x_2)^2+(y_1-y_2)^2+(z_1-z_2)^2},$$

where disf ( ) is the Euler distance function, A ($x_1$, $y_1$, $z_1$) is a geometric descriptor of point of interest A, and B ($x_2$, $y_2$, $z_2$) is a geometric descriptor of point of interest B.

In operation 44, for two points of interest which are matched in each pair of target points of interest, since the two points of interest belong to the same point in the physical space, the two points of interest can be used as connection points of two face region images at two angles corresponding to the two points of interest and the two face region images are then connected or merged together. Similarly, other face region images are connected according to the above manner. Finally, the 3D face image can be obtained.

It is to be noted, various images mentions herein such as first image, second image, face region image, (3D) face image, and the like refer to image containing at least part of the face of the object.

According to the method for face modeling of the implementations, when the face rotates, the multiple first images of the face at the multiple different angles are obtained. Face detection is performed on the any first image of the multiple first images, and the any first image is divided into the first face region and the first background region. The multiple depth images corresponding to the multiple first images are obtained and each of the multiple depth images is segmented according to the first face region and the first background region to obtain the multiple face region images. 3D face modeling is performed according to the multiple face region images to obtain the 3D face image. In this way, the depth image can be segmented by using the first face region and the first background region which are divided from the any first image, which is possible to reduce noise generated by segmenting the depth image using depth information and improve the accuracy of 3D face modeling.

Figure 2:
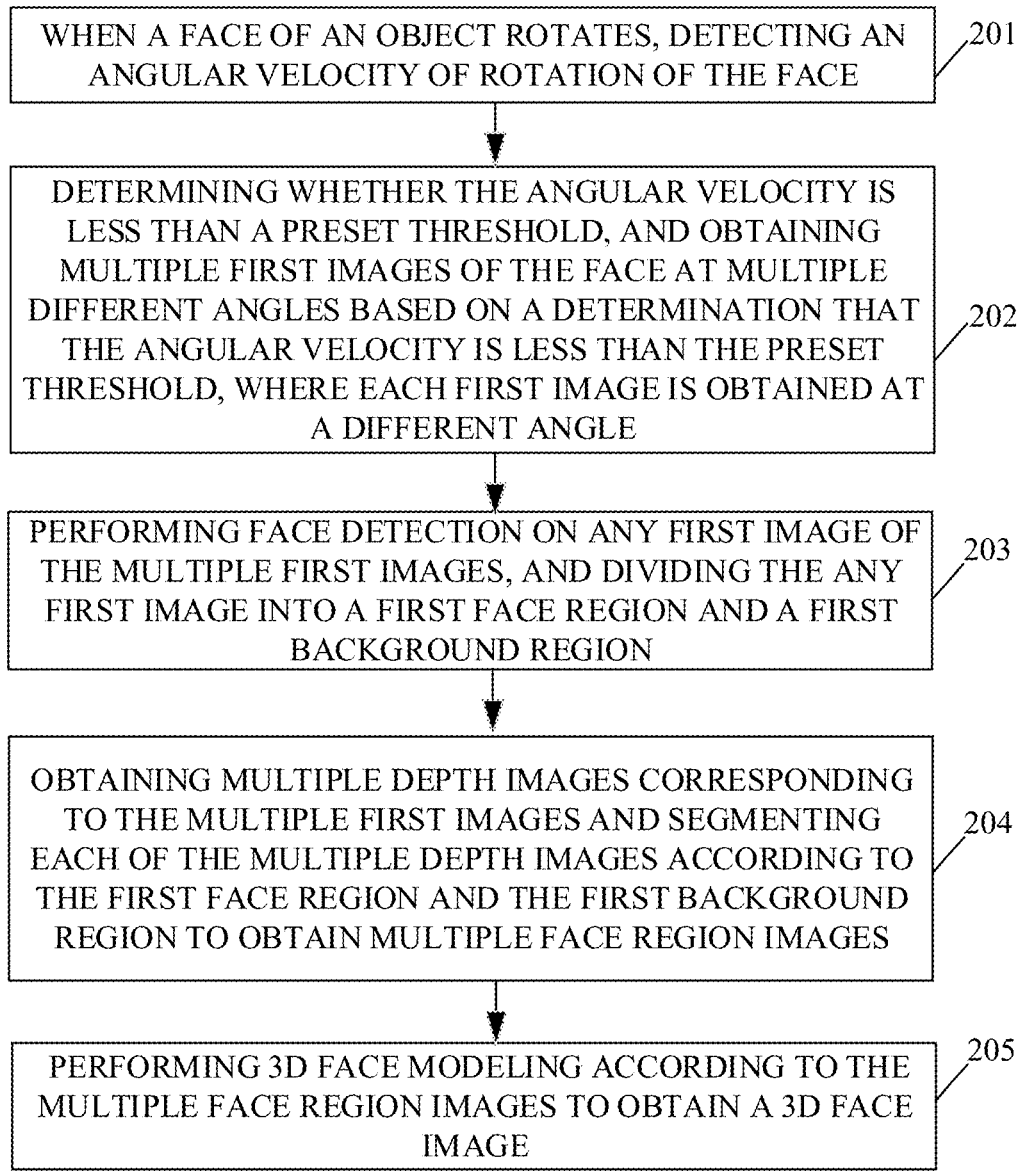
FIG. 2 is a schematic flowchart illustrating a method for face modeling according to other implementations.

FIG. 2 is a schematic flowchart illustrating a method for face modeling according to other implementations. The method is applied to the electronic device of FIG. 1A. The method begins at 201.

At 201, when a face of an object rotates, detect an angular velocity of rotation of the face.

The angular velocity of rotation of the face is detected as follows. During the rotation of the face, acquire two face images at a first moment and a second moment respectively, where the first moment is earlier than the second moment. Determine a first position and a second position of the same facial feature in the two face images respectively, where the facial feature can include left eye, right eye, nose, mouth, and so on. According to the first position and the second position, a target angle of rotation of the facial feature is calculated. Determine an absolute value of a time difference between the first moment and the second moment. Calculate the angular velocity based on the target angle and the absolute value of the time difference.

At 202, determine whether the angular velocity is less than a preset threshold, and multiple first images of the face at multiple different angles are obtained based on a determination that the angular velocity is less than the preset threshold, where each first image is obtained at a different angle.

According to the implementations, as the first image captured may be blurred when the angular velocity of rotation of the face is fast, the preset threshold can be set in advance to determine whether the angular velocity is less than the preset threshold. Only if the angular velocity is less than the preset threshold, the multiple first images of the face at the multiple different angles are acquired. If the angular velocity is greater than or equal to the preset threshold, no first image is acquired.

At 203, face detection is performed on any first image of the multiple first images, and the any first image is divided into a first face region and a first background region.

At 204, multiple depth images corresponding to the multiple first images are obtained and each of the multiple depth images is segmented according to the first face region and the first background region to obtain multiple face region images.

At 205, 3D face modeling is performed according to the multiple face region images to obtain a 3D face image.

The implementation process of the above operations 203-205 can refer to the corresponding description in operations 102-104, which will not be repeated herein.

According to the method for face modeling of the implementations, when the face rotates, the angular velocity of rotation of the face is detected. Determine whether the angular velocity is less than the preset threshold, and if so, the multiple first images of the face at the multiple different angles are obtained. Face detection is performed on the any first image of the multiple first images, and the any first image is divided into the first face region and the first background region. The multiple depth images corresponding to the multiple first images are obtained and each of the multiple depth images is segmented according to the first face region and the first background region to obtain the multiple face region images. 3D face modeling is performed according to the multiple face region images to obtain the 3D face image. In this way, the depth image can be segmented according to the first face region and the first background region which are divided from the any first image, which is possible to reduce noise generated by segmenting the depth image using depth information and improve the accuracy of 3D face modeling.

Figure 3:
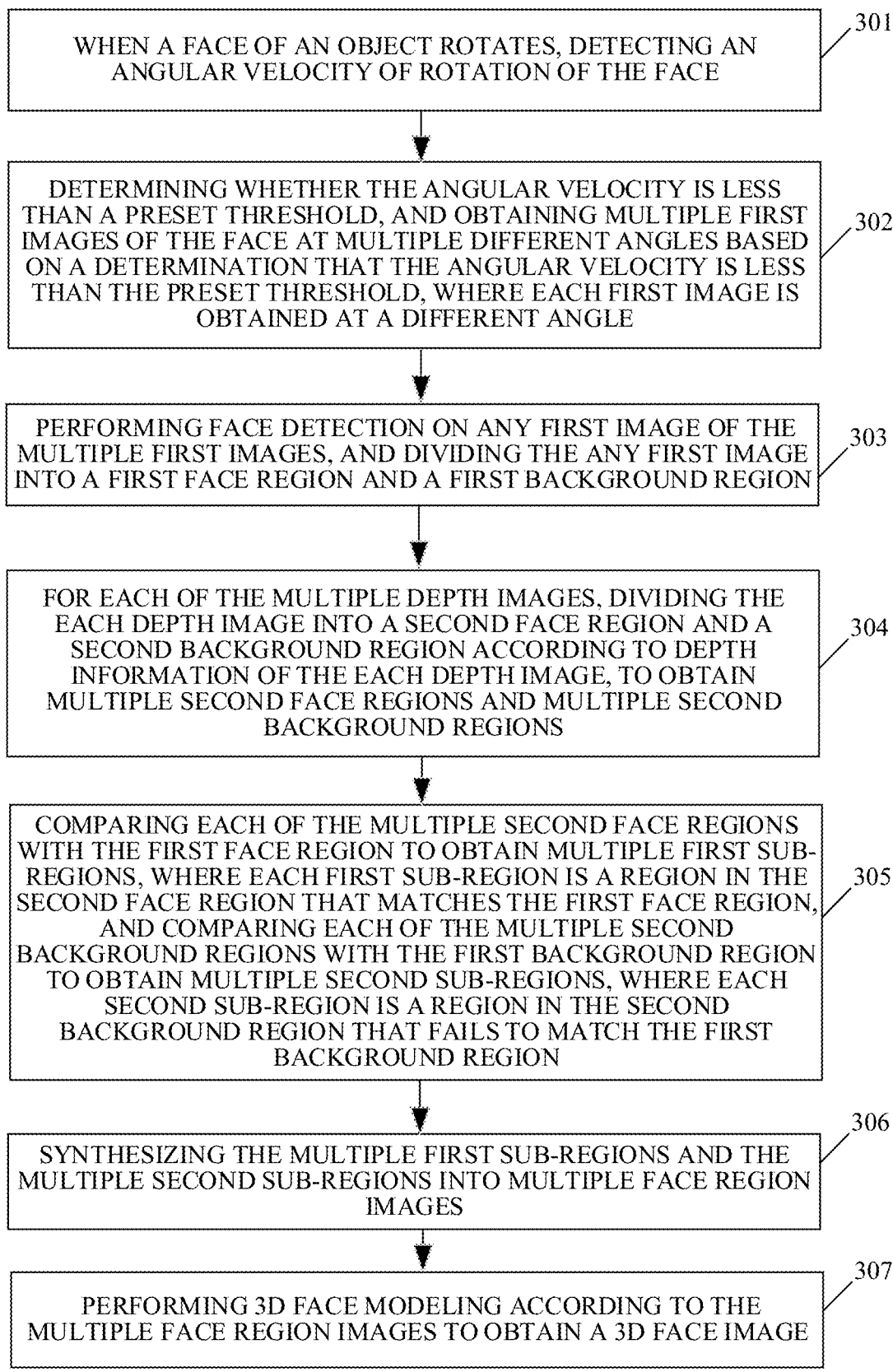
FIG. 3 is a schematic flowchart illustrating a method for face modeling according to other implementations.

FIG. 3 is a schematic flowchart illustrating a method for face modeling according to other implementations. The method is applied to the electronic device of FIG. 1A. The method begins at 301.

At 301, when a face of an object rotates, detect an angular velocity of rotation of the face.

At 302, determine whether the angular velocity is less than a preset threshold, multiple first images of the face at multiple different angles are obtained based on a determination that the angular velocity is less than the preset threshold, where each first image is obtained at a different angle, and multiple depth images corresponding to the multiple first images are obtained.

At 303, face detection is performed on any first image of the multiple first images, and the any first image is divided into a first face region and a first background region.

At 304, for each of the multiple depth images, the each depth image is divided into a second face region and a second background region according to depth information of the each depth image, to obtain multiple second face regions and multiple second background regions.

At 305, each of the multiple second face regions is compared with the first face region to obtain multiple first sub-regions, where each first sub-region is a region in the second face region that matches the first face region, and each of the multiple second background regions is compared with the first background region to obtain multiple second sub-regions, where each second sub-region is a region in the second background region that fails to match the first background region.

At 306, the multiple first sub-regions and the multiple second sub-regions are synthesized into multiple face region images.

At 307, 3D face modeling is performed according to the multiple face region images to obtain a 3D face image.

According to the method for face modeling of the implementations, when the face rotates, the angular velocity of rotation of the face is detected. Determine whether the angular velocity is less than the preset threshold, and if so, the multiple first images of the face at the multiple different angles are obtained. Face detection is performed on the any first image of the multiple first images, and the any first image is divided into the first face region and the first background region. The multiple depth images corresponding to the multiple first images are obtained and each of the multiple depth images is segmented according to the first face region and the first background region to obtain the multiple face region images. 3D face modeling is performed according to the multiple face region images to obtain the 3D face image. In this way, the depth image can be segmented according to the first face region and the first background region which are divided from the any first image, which is possible to reduce noise generated by segmenting the depth image using depth information and improve the accuracy of 3D face modeling.

The following describes a device for implementing the above method for face modeling.

Figure 4:
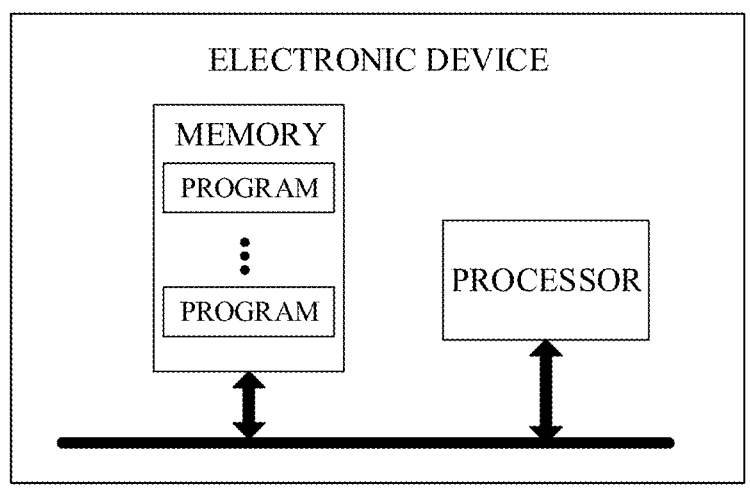
FIG. 4 is a schematic structural diagram illustrating an electronic device according to other implementations.

FIG. 4 is a schematic structural diagram illustrating an electronic device according to other implementations. The electronic device includes a processor and a memory. The memory is configured to store one or more programs. The one or more programs are configured to be executed by the processor and include instructions configured to perform the following.

Multiple first images of a face of an object at multiple different angles are obtained when the face rotates, where each first image is obtained at a different angle. Face detection is performed on any first image of the multiple first images, and the any first image is divided into a first face region and a first background region. Multiple depth images corresponding to the multiple first images are obtained and each of the multiple depth images is segmented according to the first face region and the first background region to obtain multiple face region images. 3D face modeling is performed according to the multiple face region images to obtain a 3D face image.

In at least one example, in terms of obtaining the multiple first images of the face at the multiple different angles when the face rotates, the one or more programs include instructions configured to perform the following.

An angular velocity of rotation of the face is detected when the face rotates. Determine whether the angular velocity is less than a preset threshold. The multiple first images of the face at the multiple different angles are obtained based on a determination that the angular velocity is less than the preset threshold.

In at least one example, in terms of performing face detection on the any first image of the multiple first images and dividing the any first image into the first face region and the first background region, the one or more programs include instructions configured to perform the following.

A second image is obtained by preprocessing the any first image. Multiple feature points are obtained by performing feature point extraction on the second image. An external contour of the face is constructed according to the multiple feature points, and taking inside of the external contour as the first face region and taking outside of the external contour as the first background region.

In at least one example, in terms of segmenting each of the multiple depth images according to the first face region and the first background region to obtain the multiple face region images, the one or more programs include instructions configured to perform the following.

For each of the multiple depth images, the each depth image is divided into a second face region and a second background region according to depth information of the each depth image, to obtain multiple second face regions and multiple second background regions. Each of the multiple second face regions is compared with the first face region to obtain multiple first sub-regions, where each first sub-region is a region in the second face region that matches the first face region. Each of the multiple second background regions is compared with the first background region to obtain multiple second sub-regions, where each second sub-region is a region in the second background region that fails to match the first background region. The multiple first sub-regions and the multiple second sub-regions are synthesized into the multiple face region images.

In at least one example, in terms of performing 3D face modeling according to the multiple face region images to obtain the 3D face image, the one or more programs include instructions configured to perform the following.

For each of the multiple face region images, determine a set of points of interest corresponding thereto, to obtain multiple sets of points of interest, where each of the multiple sets of points of interest includes at least one point of interest and corresponds to an angle value. Depth information of all points of interest in the multiple sets of points of interest is input into a preset 3D CNN to obtain multiple geometric descriptors, where the preset 3D CNN is configured to operate on the depth information of all points of interest to obtain the multiple geometric descriptors. The multiple sets of points of interest are divided into multiple groups, where each group includes two sets of points of interest and an angle value corresponding one of the two sets of points of interest is adjacent to an angle value corresponding to the other one of the two sets of points of interest. For each group, the two sets of points of interest are compared to obtain a target set of points of interest, where the target set of points of interest contains at least one pair of target points of interest, the pair of target points of interest includes two points of interest which are matched during comparison, and one group corresponds to one target set of points of interest. For each group, connect, according to at least one pair of points of interest in the target set of points of interest, two face region images corresponding to the each group in the multiple face region images, to obtain the 3D face image.

Figure 5:
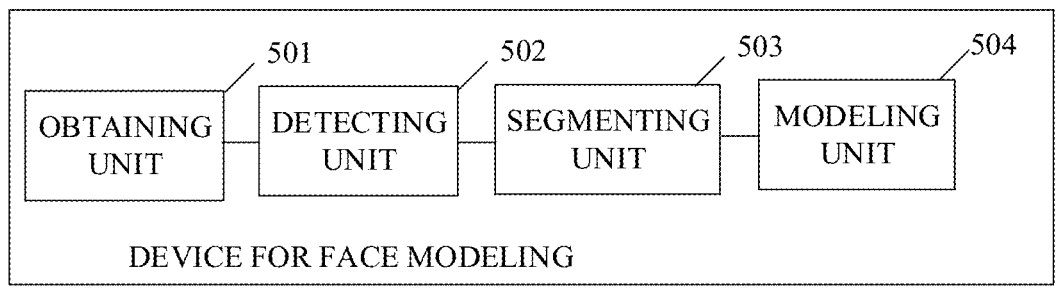
FIG. 5 is a schematic structural diagram illustrating a device for face modeling according to implementations.

FIG. 5 is a schematic structural diagram illustrating a device for face modeling according to implementations. The device includes an obtaining unit 501, a detecting unit 502, a segmenting unit 503, and a modeling unit 504.

The obtaining unit 501 is configured to obtain multiple first images of a face of an object at multiple different angles when the face rotates, where each first image is obtained at a different angle. The detecting unit 502 is configured to perform face detection on any first image of the multiple first images, and divide the any first image into a first face region and a first background region. The segmenting unit 503 is configured to obtain multiple depth images corresponding to the multiple first images, and segment each of the multiple depth images according to the first face region and the first background region to obtain multiple face region images. The modeling unit 504 is configured to perform 3D face modeling according to the multiple face region images to obtain a 3D face image.

In an implementation, the obtaining unit is configured to: detect an angular velocity of rotation of the face when the face rotates; determine whether the angular velocity is less than a preset threshold; obtain the multiple first images of the face at the multiple different angles based on a determination that the angular velocity is less than the preset threshold.

In an implementation, the detecting unit is configured to: obtain a second image by preprocessing the any first image; obtain multiple feature points by performing feature point extraction on the second image; construct an external contour of the face according to the multiple feature points, and take inside of the external contour as the first face region and take outside of the external contour as the first background region.

In an implementation, the segmenting unit is configured to: for each of the multiple depth images, divide the each depth image into a second face region and a second background region according to depth information of the each depth image, to obtain multiple second face regions and multiple second background regions; compare each of the multiple second face regions with the first face region to obtain multiple first sub-regions, where each first sub-region is a region in the second face region that matches the first face region; compare each of the multiple second background regions with the first background region to obtain multiple second sub-regions, where each second sub-region is a region in the second background region that fails to match the first background region; synthesize the multiple first sub-regions and the multiple second sub-regions into the multiple face region images.

In an implementation, the modeling unit is configured to: for each of the multiple face region images, determine a set of points of interest corresponding thereto, to obtain multiple sets of points of interest, where each of the multiple sets of points of interest includes at least one point of interest and corresponds to an angle value; input depth information of all points of interest in the multiple sets of points of interest into a preset 3D CNN to obtain multiple geometric descriptors, where the preset 3D CNN is configured to operate on the depth information of all points of interest to obtain the multiple geometric descriptors; divide the multiple sets of points of interest into multiple groups, where each group includes two sets of points of interest and an angle value corresponding one of the two sets of points of interest is adjacent to an angle value corresponding to the other one of the two sets of points of interest; for each group, compare the two sets of points of interest to obtain a target set of points of interest, where the target set of points of interest contains at least one pair of target points of interest, the pair of target points of interest includes two points of interest which are matched during comparison, and one group corresponds to one target set of points of interest; for each group, connect, according to at least one pair of points of interest in the target set of points of interest, two face region images corresponding to the each group in the multiple face region images, to obtain the 3D face image.

According to the device for face modeling and related products of the implementations, when the face rotates, the multiple first images of the face at the multiple different angles are obtained, where each first image is obtained at a different angle. Face detection is performed on the any first image of the multiple first images, and the any first image is divided into the first face region and the first background region. The multiple depth images corresponding to the multiple first images are obtained and each of the multiple depth images is segmented according to the first face region and the first background region to obtain the multiple face region images. 3D face modeling is performed according to the multiple face region images to obtain the 3D face image. In this way, the depth image can be segmented by using the first face region and the first background region which are divided from the any first image, which is possible to reduce noise generated by segmenting the depth image using depth information and improve the accuracy of 3D face modeling.

It should be understood that functions of units or modules of the device for face modeling in implementations can be implemented according to the methods in the foregoing method implementations. For details, reference may be made to the related descriptions in the foregoing method implementations, and it will not be described in further detail herein.

Figure 6:
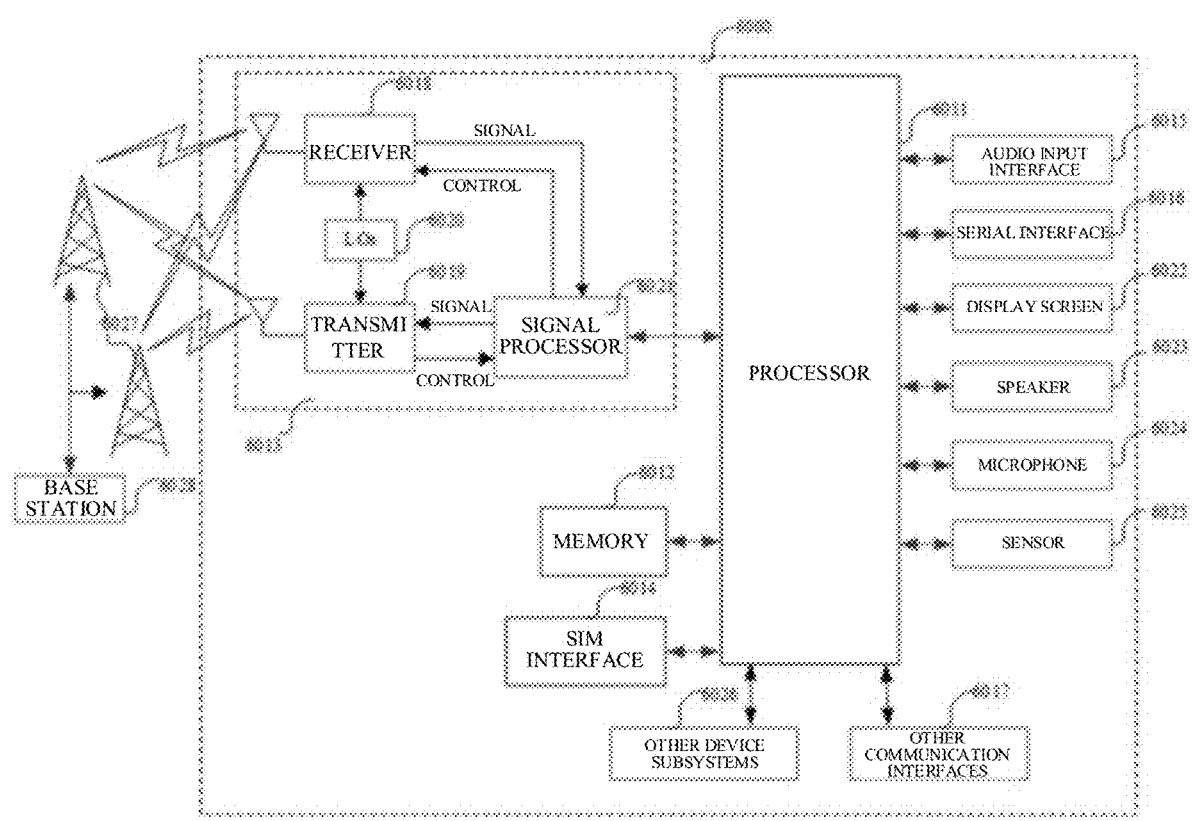
FIG. 6 is a schematic structural diagram illustrating an electronic device according to other implementations.

According to implementations, an electronic device is further provided. As illustrated in FIG. 6, only parts related to the implementations of the present disclosure are illustrated for ease of description. For technical details not described, reference may be made to the method implementations of the present disclosure. The electronic device can be any terminal device, such as a mobile phone, a tablet computer, a personal digital assistant (PDA), a point of sale terminal (POS), an on-board computer, and the like. The following describes the mobile phone as an example of the electronic device.

FIG. 6 is a block diagram illustrating partial structure of a mobile phone related to an electronic device according to implementations. As illustrated in FIG. 6, the mobile phone 6000 includes at least one processor 6011, a memory 6012, and a communication interface (including an SIM (subscriber identity module) interface 6014, an audio input interface 6015, a serial interface 6016, and other communication interfaces 6017), a signal processing module 6013 (including a receiver 6018, a transmitter 6019, an Los 6020, and a signal processor 6021), and an input/output module (including a display screen 6022, a speaker 6023, a microphone 6024, a sensor 6025, etc.). Those skilled in the art can understand that the structure of the electronic device illustrated in FIG. 6 does not constitute any limitation. The electronic device configured to implement technical solutions of the disclosure may include more or fewer components than illustrated, or may combine certain components or different components.

In the following, various components of the mobile phone will be described in detail with reference to FIG. 6.

The processor 6011 is a control center of the mobile phone. It uses various interfaces and lines to connect various parts of the whole mobile phone, runs or executes software programs and/or modules stored in the memory 6012, and calls data stored in the memory to perform various functions of the mobile phone and process data, thereby monitoring the mobile phone. In at least one example, the processor may be integrated with an application processor and a modem processor, where the application processor is mainly configured to maintain an operating system, a user interface, application programs, and so on, and the modem processor is mainly configured for wireless communication. It will be appreciated that the above-mentioned modem processor may not be integrated into the processor.

The processor 6011 is configured to perform the following operations.

Multiple first images of a face of an object at multiple different angles are obtained when the face rotates, where each first image is obtained at a different angle. Face detection is performed on any first image of the multiple first images, and the any first image is divided into a first face region and a first background region. Multiple depth images corresponding to the multiple first images are obtained and each of the multiple depth images is segmented according to the first face region and the first background region to obtain multiple face region images. 3D face modeling is performed according to the multiple face region images to obtain a 3D face image.

The memory 6012 can include a storage program area and a storage data area, where the storage program area can store an operating system and applications for implementing at least one function and the storage data area can store data created during the use of mobile phone. Furthermore, the memory can include a high-speed random access memory (RAM), and may further include a non-transitory memory such as at least one disk storage device, a flash device, or other non-transitory solid storage devices.

The communication interface is configured to communicate with external devices and includes the SIM interface 6014, the audio input interface 6015, the serial interface 6016, and other communication interfaces 6017.

The input/output module 6010 includes the display screen 6022, the speaker 6023, the microphone 6024, the sensor 6025, etc. The display screen 6022 is configured to display the first image captured and display the 3D face image obtained. The sensor 6025 can include a light sensor, a motion sensor, a brain wave sensor, a camera, and other sensors. In one example, the light sensor may include an ambient light sensor and a proximity sensor, among which the ambient light sensor may adjust the brightness of the display screen according to ambient lights, and the proximity sensor may turn off the display screen and/or backlight when the mobile phone reaches nearby the ear. The motion sensor for example can be an accelerometer sensor. The accelerometer sensor can detect the magnitude of acceleration in all directions (typically three axes) and when the mobile phone is stationary, the accelerometer sensor can detect the magnitude and direction of gravity; the accelerometer sensor can also identify mobile-phone gestures related applications (such as vertical and horizontal screen switch, related games, magnetometer attitude calibration), or the accelerometer sensor can be used for vibration-recognition related functions (such as a pedometer, percussion) and so on. The camera of the disclosure is configured to capture multiple first images, and collect depth information of the multiple first images during capturing.

The signal processing module 6013 is used to process a signal received by the mobile phone from the external device and send a signal to the external device. The external device may be, for example, a base station 6028. The receiver 6018 is used to receive a signal from the external device and transmit the signal to the signal processor 6021. The transmitter 6019 is used to transmit the signal output by the signal processor 6021.

The method of the foregoing implementations illustrated in FIG. 1B, FIG. 2, or FIG. 3 can be realized based on the structure of the mobile phone.

The functions of the units illustrated in FIG. 4 and FIG. 5 can be achieved based on the structure of the mobile phone.

Implementations of the present disclosure further provide a non-transitory computer readable storage medium. The computer readable storage medium may store computer programs for electronic data interchange. When executed, the computer programs can be operable with a computer to accomplish all or part of the operations of any of method described in the above method implementations.

Implementations of the present disclosure further provide a computer program product. The computer program product includes a non-transitory computer readable storage medium storing computer programs. The computer programs are operable with a computer to accomplish all or part of the operations of any of the methods described in the above method implementations.

It is to be noted that, for the sake of simplicity, the foregoing method implementations are described as a series of action combinations, however, it will be appreciated by those skilled in the art that the present disclosure is not limited by the sequence of actions described. That is because that, according to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, it should be understood that, the device disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection via some interfaces, or may be indirect coupling or communication among devices or units, and may be electrical connection, or other forms of connection.

The units described as separate components may or may not be physically separate, the components illustrated as units may or may not be physical units, that is, they may be in the same place or may be distributed to multiple network elements. Part or all of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the operations described in the various implementations of the present disclosure. The memory includes various medium capable of storing program codes, such as a universal serial bus (USB), a read-only memory (ROM), a random access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer readable memory, which may include a flash memory, a ROM, a RAM, Disk or CD, and so on.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for face modeling, comprising:
    detecting an angular velocity of rotation of a face when the face rotates;
    determining whether the angular velocity is less than a preset threshold;
    obtaining a plurality of first images of the face at a plurality of different angles based on a determination that the angular velocity is less than the preset threshold, wherein each first image is obtained at a different angle;
    performing face detection on any first image of the plurality of first images, and dividing the any first image into a first face region and a first background region;
    obtaining a plurality of depth images corresponding to the plurality of first images, and segmenting each of the plurality of depth images according to the first face region and the first background region to obtain a plurality of face region images; and
    performing three-dimensional (3D) face modeling according to the plurality of face region images to obtain a 3D face image.

2. The method of claim 1, wherein performing face detection on the any first image of the plurality of first images, and dividing the any first image into the first face region and the first background region comprises:
    obtaining a second image by preprocessing the any first image;
    obtaining a plurality of feature points by performing feature point extraction on the second image; and
    constructing an external contour of the face according to the plurality of feature points, and taking inside of the external contour as the first face region and taking outside of the external contour as the first background region.

3. The method of claim 2, wherein segmenting each of the plurality of depth images according to the first face region and the first background region to obtain the plurality of face region images comprises:

for each of the plurality of depth images, dividing the each depth image into a second face region and a second background region according to depth information of the each depth image, to obtain a plurality of second face regions and a plurality of second background regions;

comparing each of the plurality of second face regions with the first face region to obtain a plurality of first sub-regions, wherein each first sub-region is a region in the second face region that matches the first face region;

comparing each of the plurality of second background regions with the first background region to obtain a plurality of second sub-regions, wherein each second sub-region is a region in the second background region that fails to match the first background region; and synthesizing the plurality of first sub-regions and the plurality of second sub-regions into the plurality of face region images.

4. The method of claim 1, wherein segmenting each of the plurality of depth images according to the first face region and the first background region to obtain the plurality of face region images comprises:

for each of the plurality of depth images, dividing the each depth image into a second face region and a second background region according to depth information of the each depth image, to obtain a plurality of second face regions and a plurality of second background regions;

comparing each of the plurality of second face regions with the first face region to obtain a plurality of first sub-regions, wherein each first sub-region is a region in the second face region that matches the first face region;

comparing each of the plurality of second background regions with the first background region to obtain a plurality of second sub-regions, wherein each second sub-region is a region in the second background region that fails to match the first background region; and synthesizing the plurality of first sub-regions and the plurality of second sub-regions into the plurality of face region images.

5. The method of claim 4, wherein performing 3D face modeling according to the plurality of face region images to obtain the 3D face image comprises:

for each of the plurality of face region images, determining a set of points of interest corresponding thereto, to obtain a plurality of sets of points of interest, wherein each of the plurality of sets of points of interest comprises at least one point of interest and corresponds to an angle value;

inputting depth information of all points of interest in the plurality of sets of points of interest into a preset 3D convolutional neural network (CNN) to obtain a plurality of geometric descriptors, wherein the preset 3D CNN is configured to operate on the depth information of all points of interest to obtain the plurality of geometric descriptors;

dividing the plurality of sets of points of interest into a plurality of groups, wherein each group comprises two sets of points of interest and an angle value corresponding one of the two sets of points of interest is adjacent to an angle value corresponding to the other one of the two sets of points of interest;

for each group, comparing the two sets of points of interest to obtain a target set of points of interest, wherein the target set of points of interest contains at least one pair of target points of interest, the pair of target points of interest comprises two points of interest which are matched during comparison, and one group corresponds to one target set of points of interest; and for each group, connecting, according to at least one pair of points of interest in the target set of points of interest, two face region images corresponding to the each group in the plurality of face region images, to obtain the 3D face image.

6. The method of claim 1, wherein obtaining the plurality of depth images corresponding to the plurality of first images comprises:

obtaining the plurality of depth images by converting each first image of the plurality of first images into a depth image according to a 3D reconstruction algorithm.

7. The method of claim 1, wherein the any first image is a front face image of the face.

8. An electronic device, comprising:

at least one camera configured to obtain a plurality of first images of a face of an object at a plurality of different angles when the face rotates, wherein each first image is obtained at a different angle;

at least one processor coupled with the at least one camera; and a non-transitory computer readable storage, coupled to the at least one processor and storing at least one computer executable instruction thereon which, when executed by the at least one processor, causes the at least one processor to:

obtain a second image by preprocessing any first image of the plurality of first images;

obtain a plurality of feature points by performing feature point extraction on the second image;

construct an external contour of the face according to the plurality of feature points, and take inside of the external contour as a first face region and take outside of the external contour as a first background region;

obtain a plurality of depth images corresponding to the plurality of first images, and segment each of the plurality of depth images according to the first face region and the first background region to obtain a plurality of face region images; and perform three-dimensional (3D) face modeling according to the plurality of face region images to obtain a 3D face image.

9. The electronic device of claim 8, wherein the at least one camera configured to obtain the plurality of first images of the face at the plurality of different angles when the face rotates is configured to:

detect an angular velocity of rotation of the face when the face rotates;

determine whether the angular velocity is less than a preset threshold; and obtain the plurality of first images of the face at the plurality of different angles based on a determination that the angular velocity is less than the preset threshold.

10. The electronic device of claim 8, wherein the at least one processor configured to segment each of the plurality of depth images according to the first face region and the first background region to obtain the plurality of face region images is further configured to:
for each of the plurality of depth images, divide the each depth image into a second face region and a second background region according to depth information of the each depth image, to obtain a plurality of second face regions and a plurality of second background regions;
compare each of the plurality of second face regions with the first face region to obtain a plurality of first sub-regions, wherein each first sub-region is a region in the second face region that matches the first face region;
compare each of the plurality of second background regions with the first background region to obtain a plurality of second sub-regions, wherein each second sub-region is a region in the second background region that fails to match the first background region; and
synthesize the plurality of first sub-regions and the plurality of second sub-regions into the plurality of face region images.

11. The electronic device of claim 10, wherein the at least one processor configured to perform 3D face modeling according to the plurality of face region images to obtain the 3D face image is further configured to:
for each of the plurality of face region images, determine a set of points of interest corresponding thereto, to obtain a plurality of sets of points of interest, wherein each of the plurality of sets of points of interest comprises at least one point of interest and corresponds to an angle value;
input depth information of all points of interest in the plurality of sets of points of interest into a preset 3D convolutional neural network (CNN) to obtain a plurality of geometric descriptors, wherein the preset 3D CNN is configured to operate on the depth information of all points of interest to obtain the plurality of geometric descriptors;
divide the plurality of sets of points of interest into a plurality of groups, wherein each group comprises two sets of points of interest and an angle value corresponding one of the two sets of points of interest is adjacent to an angle value corresponding to the other one of the two sets of points of interest;
for each group, compare the two sets of points of interest to obtain a target set of points of interest, wherein the target set of points of interest contains at least one pair of target points of interest, the pair of target points of interest comprises two points of interest which are matched during comparison, and one group corresponds to one target set of points of interest; and
for each group, connect, according to at least one pair of points of interest in the target set of points of interest, two face region images corresponding to the each group in the plurality of face region images, to obtain the 3D face image.

12. The electronic device of claim 8, wherein the at least one processor configured to segment each of the plurality of depth images according to the first face region and the first background region to obtain the plurality of face region images is further configured to:
for each of the plurality of depth images, divide the each depth image into a second face region and a second background region according to depth information of the each depth image, to obtain a plurality of second face regions and a plurality of second background regions;

compare each of the plurality of second face regions with the first face region to obtain a plurality of first sub-regions, wherein each first sub-region is a region in the second face region that matches the first face region;
compare each of the plurality of second background regions with the first background region to obtain a plurality of second sub-regions, wherein each second sub-region is a region in the second background region that fails to match the first background region; and
synthesize the plurality of first sub-regions and the plurality of second sub-regions into the plurality of face region images.

13. The electronic device of claim 8, wherein the at least one processor configured to obtain the plurality of depth images corresponding to the plurality of first images is further configured to:
obtain the plurality of depth images by converting each first image of the plurality of first images into a depth image according to a 3D reconstruction algorithm.

14. The electronic device of claim 8, wherein the any first image is a front face image of the face.

15. A non-transitory computer readable storage medium storing a computer program which, when executed by a processor, causes the processor to:
obtain a plurality of first images of a face of an object at a plurality of different angles when the face rotates, wherein each first image is obtained at a different angle;
perform face detection on any first image of the plurality of first images, and divide the any first image into a first face region and a first background region;
obtain a plurality of depth images corresponding to the plurality of first images;
for each of the plurality of depth images, dividing the each depth image into a second face region and a second background region according to depth information of the each depth image, to obtain a plurality of second face regions and a plurality of second background regions;
comparing each of the plurality of second face regions with the first face region to obtain a plurality of first sub-regions, wherein each first sub-region is a region in the second face region that matches the first face region;
comparing each of the plurality of second background regions with the first background region to obtain a plurality of second sub-regions, wherein each second sub-region is a region in the second background region that fails to match the first background region;
synthesizing the plurality of first sub-regions and the plurality of second sub-regions into a plurality of face region images; and
perform three-dimensional (3D) face modeling according to the plurality of face region images to obtain a 3D face image.

16. The non-transitory computer readable storage medium of claim 15, wherein the computer program, when executed by a processor, further causes the processor to:
detect an angular velocity of rotation of the face when the face rotates;
determine whether the angular velocity is less than a preset threshold; and
obtain the plurality of first images of the face at the plurality of different angles based on a determination that the angular velocity is less than the preset threshold.

17. The non-transitory computer readable storage medium of claim 15, wherein performing face detection on the any first image of the plurality of first images, and divide the any first image into the first face region and the first background region further includes:
- obtaining a second image by preprocessing the any first image;
- obtaining a plurality of feature points by performing feature point extraction on the second image; and
- constructing an external contour of the face according to the plurality of feature points, and taking an inside of the external contour as the first face region and take outside of the external contour as the first background region.

\* \* \* \* \*